United States Patent Office 3,457,265
Patented July 22, 1969

3,457,265
PYRIDYL-DIHYDROISOQUINOLINES
Ernst Seeger, Wolfhard Engel, and Rudolf Kadatz, Biberach an der Riss, Germany, assignors to Boehringer Ingelheim G.m.b.H., Ingelheim am Rhein, Germany, a corporation of Germany
No Drawing. Filed Mar. 2, 1966, Ser. No. 531,042
Claims priority, application Germany, Mar. 24, 1965, T 28,238; Dec. 10, 1965, T 29,988; Dec. 22, 1965, T 30,096
Int. Cl. C07d *35/36;* A61k *27/00*
U.S. Cl. 260—288                                10 Claims

ABSTRACT OF THE DISCLOSURE

The compounds are 3,4-dihydro-3,3-di-substituted-1-(3'- or 4'-pyridyl)-isoquinolines and non-toxic acid addition salts thereof, useful as antiphlogistics and antipyretics in warm-blooded animals.

---

This invention relates to novel pyridyl-dihydroisoquinolines as well as to various methods of preparing these compounds.

More particularly, the present invention relates to pyridyl-dihydroisoquinolines of the formula

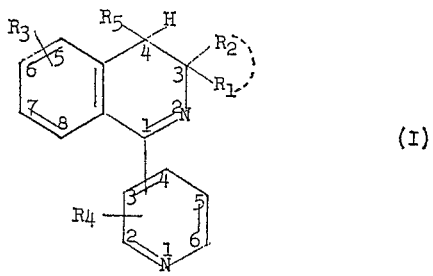

wherein $R_1$ is alkyl of 1 to 5 carbon atoms or

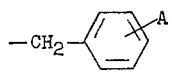

where A is hydrogen, methyl or halogen; $R_2$ is alykl of 1 to 5 carbon atoms; $R_1$ and $R_2$, together with each other and the carbon atom to which they are attached, form a cycloalkane ring of 5 to 6 carbon atoms; $R_3$ is hydrogen, lowed alkyl or halogen; $R_4$ and $R_5$, which may be identical to or different from each other, are hydrogen or lower alkyl, and the bond from the 1-position of the dihydroisoquinoline moiety is attached to the 3- or 4-position of the pyridyl substituent, and non-toxic, pharmacologically acceptable acid addition salts thereof.

The compounds according to the present invention may be prepared by various methods, among which the following have proved to be most convenient and efficient:

Method A.—By reacting a compound of the formula

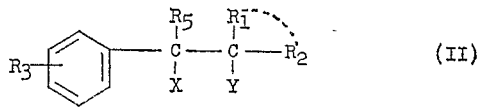

wherein $R_1$, $R_2$, $R_3$ and $R_5$ have the same meanings as in Formula I and X and Y, which must be different from each other, are hydrogen, hydroxyl, hydroxyl esterified with a carboxylic acid or a sulfonic acid, or halogen if one of them is hydrogen, or X and Y together represent a double bond, with a 3- or 4-cyanopyridine compound of the formula

wherein $R_4$ has the same meanings as in Formula I, or a salt thereof, such as the hydrogen, sulfate, at elevated temperatures, especially at a temperature between 70 and 125° C., and in the presence of a cyclization agent, such as sulfuric acid, phosphoric acid, borontrifluoride methanesulfuric acid, polyphosphoric acid, aromatic sulfonic acids, polyphosphoric acid esters and zinc chloride. The employment of sulfuric acid as a cyclization agent is preferred, however, since it produces by far the best yields.

The reaction is advantageously carried out in the presence of an inert organic solvent or diluent having a relatively high boiling point, such as xylene, o-dichlorobenzene, nitrobenzene, tetrachloroethane, tetrachlorethylene, diphenylether or the like. However, the reaction may also be carried out without a solvent or diluent.

More particularly, the reaction is carried out in the following manner. The cyanopyridine compound or a salt thereof is placed into the reaction vessel and is there admixed with the calculated amount of sulfuric acid or any of the other cyclization agents, accompanied by cooling. Thereafter, the compound of the Formula II is introduced into the mixture, accompanied by continuous stirring, so that the internal temperature rises to between 70 and 125° C., preferably 85 and 95° C. However, the reaction may also be carried out by first admixing the cyanopyridine compound or a salt thereof with the compound of the Formula II in the reaction vessel, slightly heating the mixture, and then introducing the sulfuric acid or any of the other cyclization agents, accompanied by continuous stirring, so that the internal temperature rises to between 70 and 125° C.

If the reaction is performed at temperatures below those indicated above, the product is a mixture of dihydroisoquinolines with varying amounts of N-substituted pyridine carboxylic acid amides.

The carbinol starting compound embraced by Formula II, to the extent that they are not specifically described in the literature, may be prepared according to well known methods; for instance, by reacting the corresponding ketones, or in some cases the corresponding aldehydes, with a suitable Grignard reagent. In the carbinols the hydroxyl group may be exchanged for a halogen atom; for instance, by treating the carbinol with a hydrogen halide, phosphorus halide or the like. Thus, good yields of 2-methyl-2-chloro-1-phenyl-propane B.P. 86–89° C. at 10 mm. Hg) may be obtained from 2-methyl-1-phenyl-propanol-(2).

The styrolene compounds embraced by Formula II, i.e. those wherein X and Y together represent a double bond, to the extent that they are not specifically described in the literature, may be prepared in customary fashion by treating a corresponding carbinol with a dehydrating agent; for instance, β,β-dimethylstyrolene (B.P. 69–70° C. at 12 mm. Hg) may be obtained in this manner from 2-methyl-1-phenyl-propanol-(2).

It is known that the reaction of 2-benzyl-2-propanol with 3-cyanopyridine in the presence of sulfuric acid produces N-(2-benzyl-2-propyl)-nicotinic acid amide with a 71% yield. However, the preparation of dihydroisoquinolines under these conditions has heretofore been limited to reactions between methyleugenol and benzonitriles. It is therefore surprising that good yields of pyridyl-dihydroisoquinolines of the Formula I above are obtainable in a single-step process by maintaining certain reaction conditions, as set forth above.

Method B.—By cyclization and dehydration of a pyridine 3- or 4-carboxylic acid amide of the formula

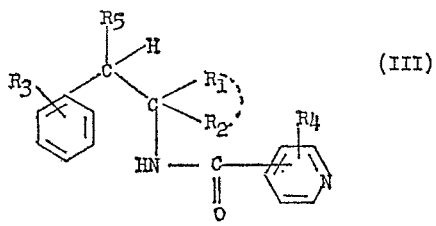

wherein $R_1$, $R_2$, $R_3$, $R_4$ and $R_5$ have the same meanings as in Formula I above.

The cyclodehydration of the pyridine carboxamide III is effected by the Bischler-Napieralski Reaction [Berichte 26, 1903 (1893)], that is, by treating compound III with a condensing agent such as phosphorus oxychloride, zinc chloride, phosphorus pentachloride or polyphosphoric acid esters. Particularly adavntageous is the employment of phosphorus pentoxide, or a mixture of phosphorus oxychloride and phosphorus pentoxide, or a mixture of phosphorus oxychloride and zinc chloride, or polyphosphoric acid as the condensing agent. In some instances it is of advantage to treat the pyridine carboxamide first with phosphorus pentachloride and then with aluminum chloride.

The cyclodehydration reaction is preferably carried out in the presence of an anhydrous inert organic solvent, such, as o-dichlorobenzene, toluene, xylene, tetrahydronaphthalene, nitrobenzene and chloroform, and at a temperature between 25 and 250° C.

To the extent that they are not specifically described in the literature, the pyridine carboxamides of the Formula III, which are used as starting materials in this method, may be prepared pursuant to well known methods; for instance, by reacting a pyridine carboxylic acid chloride or a pyridine carboxylic acid ester with an amine (see Klingsberg, "Pyridine and Its Derivatives," part 3, page 218, Interscience Publishers 1962).

Method C.—By reacting a metal halide complex of a 3- or 4-cyanopyridine of the Formula IIa above with a compound of the formula

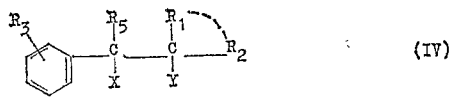

wherein $R_1$, $R_2$, $R_3$ and $R_5$ have the same meanings as in Formula I, one of substituents X and Y is hydrogen and the other is hydroxyl, halogen or hydroxyl esterified with a carboxylic or sulfonic acid.

The cyanopyridine metal halide complex compound does not need to be isolated and purified prior to reacting it with compound IV; the reaction is carried out at a temperature between 50 and 170° C., preferably between 100 and 150° C.

Starting compounds embraced by Formula IV wherein X or Y is hydroxyl esterified with a carboxylic or sulfonic acid have proved to be advantageously reacted while introducing a gaseous hydrogen halide into the reaction.

Metal halides suitable for formation of the cyanopyridine complex are the so-called Lewis acids, such as aluminium chloride, tin tetrachloride, antimony trichloride, antimony pentachloride, titanium tetrachloride, boron trifluoride and ferric chloride.

The reaction of the cyanopyridine IIa with an equimolar amount of a metal halide or Lewis acid (for a definition of the term "Lewis acids" see Houben-Weyl, vol. IV, II, pages 67 et seq.) to form the corresponding metal halide complex is carried out in known fashion, for instance, by the method of Klages and Grill, Liebigs Annalen 594, 29 (1955), preferably in the presence of an inert solvent, such as tetrachloroethane, ethylenechloride, o-dichlorobenzene or nitrobenzene, at a temperature between 0 and 70° C.

However, the reaction to form the pyridyl-dihydroisoquinoline according to the present method may also be carried out by first admixing a cyanopyridine IIa with a compound of the Formula IV in the presence of an inert solvent, if desired, then adding the Lewis acid while stirring, and heating the reaction mixture to the reaction temperature indicated above.

Method D.—By reacting a 3- or 4-cyanopyridine of the Formula IIa with a styrolene of the formula

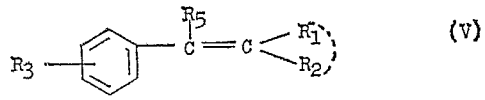

wherein $R_1$, $R_2$, $R_3$ and $R_5$ have the same meanings as in Formula I, in the presence of a Lewis acid, such as tin tetrachloride, aluminum chloride, antimony trichloride, antimony pentachloride, ferric chloride or zinc chloride, and preferably while introducing a halogen hydrogen halide into the reaction mixture.

The reaction of a cyanopyridine IIa with a styrolene V is advantageously carried out by admixing a solution of the cyanopyridine in an inert solvent with an equimolar amount of the Lewis acid, adding the styrolene to the mixture, and then heating the reaction mixture to a temperature between 50 and 200° C., preferably between 100 and 150° C. It has been found to be particularly advantageous to introduce a hydrogen halide into the mixture of the cyanopyridine, Lewis acid and inert solvent, then adding the styrolene, and continuously introducing a hydrogen halide into the reaction mixture while heating it to the reaction temperature and until the reaction has gone to completion. Another alternative is to admix the cyanopyridine with the styrolene in an inert solvent, then adding the Lewis acid, and finally heating the reaction mixture to the reaction temperature, advantageously while introducing a hydrogen halide.

The dihydroisoquinoline compounds according to the present invention, as defined by Formula I above, are bases and therefore form non-toxic acid addition salts with inorganic and organic acids. Their acid addition salts may be obtained in customary fashion; for instance, by dissolving the free base in a suitable inert solvent and acidifying the solution with the desired inorganic or organic acid. Examples of acids which form non-toxic, pharmacologically acceptable acid addition salts with the compounds of the Formula I are hydrochloric acid, hydrobromic acid, phosphoric acid, trataric acid, citric acid, acetic acid, malic acid, maleic acid, 2-furoic acid, 8-chlorotheophylline and the like.

The following examples will further illustrate the present invention and enable others skilled in the art to understand it more completely. It should be understood, however, that the instant invention is not limited to the particular examples given below.

EXAMPLE I

Preparation of 3,4-dihydro-3,3-dimethyl-1-(4'-pyridyl)-isoquinoline by Method A 35 cc. of concentrated sulfuric acid were added to 20 gm. of 4-cyanopyridine hydrogensulfate (M.P. 137° C.) while cooling, and then 15 cc. of o-dichlorobenzene were added. Thereafter, 15 gm. of 2-benzyl-2-propanol were added to the mixture all at once while stirring, whereby the temperature of the mixture rose to 90–95° C. Subsequently, the reaction mixture was stirred for two hours at room temperature and then poured over ice. The aqueous mixture was extracted with ether, and the ether extract solution was discarded. Ammonia was added to the aqueous phase, whereby a crystalline precipitate was formed, which was separated and recrystallized from ethyl acetate. 21 gm. of a colorless crystalline substance having a melting point of 172° C. were obtained. It was identified to be 3,4-dihydro-3,3-dimethyl-1-(4′-pyridyl)-isoquinoline of the formula

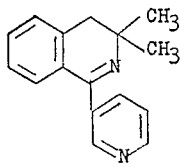

The base was dissolved in ether, the solution was acidified with ethereal hydrochloric acid, and the precipitate formed thereby was isolated and recrystallized from a mixture of ethyl acetate and isopropanol. It had a melting point of 258° C. and was identified to be the dihydrochloride of 3,4-dihydro-3,3-dimethyl-1-(4′-pyridyl)-isoquinoline.

Analogous results were obtained when o-dichlorobenzene was replaced by xylene, nitrobenzene, tetrachloroethane, tetrachloro-ethylene, or diphenyl ether as the solvent.

EXAMPLE 2

40 cc. of concentrated sulfuric acid were added to 10.4 gm. of 4-cyanopyridine while thoroughly cooling and stirring the mixture. Thereafter, 15 gm. of 2-benzyl-2-propanol were allowed to flow into the mixture while stirring, so that the temperature rapidly rose to 95° C. and remained there. After all of the 2-benzyl-2-propanol had been added, the reaction mixture was stirred at room temperature for three hours, then poured over ice, the aqueous mixture was extracted with ether, the ether extract solution was discarded, and the aqueous solution was made alkaline with sodium hydroxide. The precipitate formed thereby was isolated, taken up in chloroform, the chloroform solution war evaporated and the residue was recrystallized from acetone. 16 gm. of a colorless crystalline substance having a melting point of 171–172° C. were obtained, which was identified to be 3,4-dihydro-3,3-dimethyl-1-(4′-pyridyl)-isoquinoline.

EXAMPLE 3

35 cc. of concentrated sulfuric acid were rapidly added to a mixture consisting of 20 gm. of 4-cyanopyridine hydrogensulfate, 15 gm. of 2-benzyl-2-propanol, and 15 cc. of xylene, so that the temperature rose to about 90° C. Thereafter, the reaction mixture was stirred for three hours at room temperature and was then worked up as described in Example 1. 17 gm. of a colorless crystalline substance having a melting point of 171–172° C. were obtained; it was identified to be 3,4-dihydro-3,3-dimethyl-1-(4′-pyridyl)-isoquinoline.

EXAMPLE 4

5.2 gm. of 4-cyanopyridine were admixed at a temperature of 10° C. with 20 cc. of concentrated sulfuric acid, and then 7 gm. of β,β-dimethyl styrolene (B.P. 69–70° C. at 12 mm. Hg) were added all at once to the mixture while stirring, whereby the temperature rose to about 90° C. Thereafter, the reaction mixture was stirred for two hours and was worked up as described in Example 1. 8 gm. of 3,4-dihydro-3,3-dimethyl-1-(4′-pyridyl)-isoquinoline having a melting point of 1720° C. were obtained.

EXAMPLE 5

9 gm. of 2-methyl-2-chloro-1-phenylpropane (B.P. 86–89° C. at 10 mm. Hg) were added all at once to a solution of 10 gm. of 4-cyanopyridine hydrogensulfate in 29 cc. of cold concentrated sulfuric acid, whereby hydrogenchloride was evolved. Thereafter, the reaction mixture was stirred for three hours and then worked up as described in Example 2. 8 gm. of 3,4-dihydro-3,3-dimethyl-1-(4′-pyridyl)-isoquinoline were obtained.

EXAMPLE 6

While cooling and stirring, 10.4 gm. of 4-cyanopyridine were admixed at 0–10° C. dropwise with 40 cc. of concentrated sulfuric acid. Thereafter, while stirring, 15 gm. of 2-methyl-1-phenyl-1-propanol (B.P. 99–100° C. at 12 mm. Hg) were added all at once to the mixture, whereby the temperature rapidly rose to 95° C. Subsequently, the reaction mixture was stirred for three hours at room temperature and was then worked up as described in Example 2. 14 gm. of a colorless crystalline substance having a melting point of 171–172° C. were obtained; it was identified to be 3,4-dihydro-3,3-dimethyl-1-(4′-pyridyl)-isoquinoline.

EXAMPLE 7

While cooling and stirring, 40 cc. of concentrated sulfuric acid were added dropwise to a solution of 10.4 gm. of 3-cyanopyridine in 30 cc. of O-dichlorobenzene at a temperature of 0–10° C. After all of the sulfuric acid had been added, 15 gm. of 2-benzyl-2-propanol were added all at once while stirring, whereby the temperature rose to 80–90° C. The reaction mixture was then worked up as described in Example 1. The initially oily reaction product having a boiling point of 124° C. at 0.05 mm. Hg solidified upon standing and was recrystallized from gasoline, yielding 17 gm. of a crystalline substance having a melting point of 95–97° C.; it was identified to be 3,4-dihydro - 3,3 - dimethyl - 1 - (3′-pyridyl)-isoquinoline of the formula

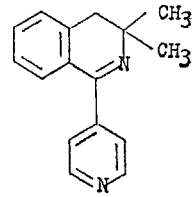

The dihydrochloride of the base, obtained by dissolving the base in ether and acidifying the solution with etheral hydrochloric acid, had a melting point of 220° C. (decomposition) after recrystallization from a mixture of ethylacetate and isopropanol.

EXAMPLE 8

Preparation of 3,4-dihydro-1-(4′-pyridyl)-isoquinoline-3-spiro-cyclohexane by Method A 5.2 gm. of 4-cyanopyridine were admixed at 0° C., while stirring, with 20 cc. of concentrated sulfuric acid, and then 9.5 gm. of 1-benzyl-1-cyclohexanol (B.P. 147° C. at 13 mm. Hg; M.P. 57° C.) were added to the mixture all at once, whereby the temperature rose to 70–80° C. The reaction mixture was then stirred for thirty minutes and was worked up as described in Example 2. The initially oily reaction product had a boiling point of 152–153° C. at 0.1 mm. Hg, and crystallized upon standing for some time. 8 gm. of 3,4-dihydro-1-(4′-pyridyl)-isoquinoline-3-spiro-cyclohexane of the formula

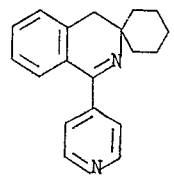

were obtained. Its colorless dihydrochloride had a melting point of 250° C.

EXAMPLE 9

Using a procedure analogous to that described in Example 1, 3,4-dihydro-3,3-diethyl-1-(4′ - pyridyl)-isoquinoline, B.P. 135° C. at 0.01 mm. Hg, M.P. 60–61° C. of the formula

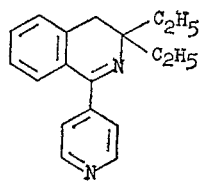

was prepared from 3-benzyl-3-pentanol (B.P. 121° C. at 12 mm. Hg) and 4-cyanopyridine hydrogensulfate. The dihydrochloride had a melting point of 221–223° C.

EXAMPLE 10

Using a procedure analogous to that described in Example 1, 3,4-dihydro-3-methyl-3-ethyl-1-(4'-pyridyl)-isoquinoline, M.P. 95–96° C., of the formula

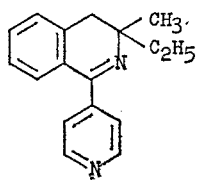

was prepared from 2-benzyl-2-butanol (B.P. 109–111° C. at 12 mm. Hg) and 4-cyanopyridine hydrogensulfate. The dihydrochloride had a melting point of 230–233° C.

EXAMPLE 11

Using a procedure analogous to that described in Example 1, 3,4-dihydro-3-methyl-3-n-pentyl-1-(4'-pyridyl)-isoquinoline, B.P. 175–176° C. at 0.2 mm. Hg, of the formula

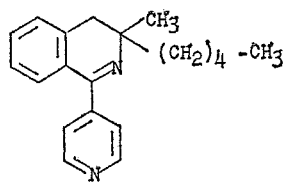

was prepared from 2-benzyl-2-heptanol (B.P. 89° C. at 0.15 mm. Hg) and 4-cyanopyridine hydrogensulfate.

EXAMPLE 12

Using a procedure analogous to that described in Example 1, 3,4-dihydro-3-ethyl-3-n-butyl-1-(4'-pyridyl)-isoquinoline, B.P. 166–167° C. at 0.3 mm. Hg, of the formula

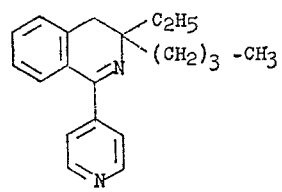

was prepared from 3-benzyl-3-heptanol (B.P. 107° C. at 0.6 mm. Hg) and 4-cyanopyridine hydrogensulfate. The dihydrochloride had a melting point of 195° C.

EXAMPLE 13

Using a procedure analogous to that described in Example 1, 3,4-dihydro-3,3-di-n-propyl-1-(4'-pyridyl)-isoquinoline, B.P. 146° C. at 0.08 mm. Hg, M.P. 65–67° C., of the formula

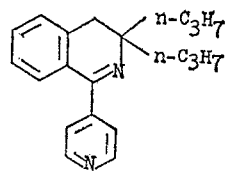

was prepared from 4-benzyl-4-heptanol (B.P. 141° C. at 12 mm. Hg) and 4-cyanopyridine hydrogensulfate. The dihydrochloride had a melting point of 230° C.

EXAMPLE 14

Using a procedure analogous to that described in Example 1, 3,4 - dihydro - 3 - methyl - 3 - n-propyl-1-(4'-pyridyl)-isoquinoline, B.P. 136–137° C. at 0.01 mm. Hg, of the formula

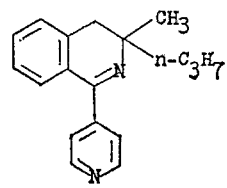

was prepared from 2-benzyl-2-pentanol (B.P. 121° C. at 12 mm. Hg) and 4-cyanopyridine hydrogensulfate. The dihydrobromide had a melting point of 250–252° C.

EXAMPLE 15

Using a procedure analogous to that described in Example 1, 3,4-dihydro-3-methyl-3-benzyl-1-(4'-pyridyl)-isoquinoline, B.P. 187–189° C. at 0.08 mm. Hg, of the formula

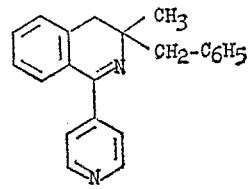

was prepared from 1,3 - diphenyl - 2 - propanol (B.P. 113–114° C. at 0.06 mm. Hg) and 4-cyanopyridine hydrogensulfate. The dihydrochloride had a melting point of 236–238° C.

EXAMPLE 16

Using a procedure analogous to that described in Example 2, 3,4 - dihydro - 3,3 - dimethyl-4-methyl-1-(4'-pyridyl)-isoquinoline, M.P. 63–64° C., of the formula

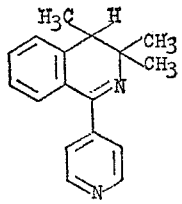

was prepared from 3-methyl-2-phenyl-2-butanol (B.P. 109–110° C. at 12 mm. Hg) and 4-cyanopyridine. The dihydrochloride had a melting point of 250° C.

EXAMPLE 17

Using a procedure analogous to that described in Example 2, 3,4-dihydro-3,3,7-trimethyl-1-(4'-pyridyl)-isoquinoline, M.P. 110–112° C., of the formula

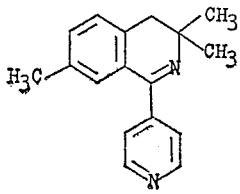

was prepared from 2-(4'-methyl-benzyl)-2-propanol (B.P. 110–112° C. at 12 mm. Hg, M.P. 42–43° C.) and 4-cyanopyridine. The dihydrochloride had a melting point of 267° C.

EXAMPLE 18

Using a procedure analogous to that described in Example 2, 3,4-dihydro-3,3-diethyl-7-chloro-1-(4'-pyridyl)-isoquinoline, B.P. 160–161° C. at 0.08 mm. Hg, of the formula

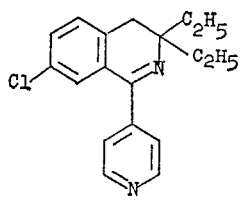

was prepared from 3-(4'-chloro-benzyl)-3-pentanol (B.P. 122° C. at 12 mm. Hg) and 4-cyanopyridine. The dihydrochloride had a melting point of 235–240° C.

EXAMPLE 19

Using a procedure analogous to that described in Example 2, 3,4-dihydro-3,3-dimethyl-1-(4'-methyl-3'-pyridyl)-isoquinoline, B.P. 129–130° C. at 0.02 mm. Hg, of the formula

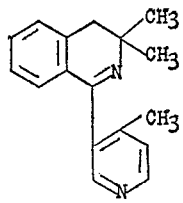

was prepared from 2-benzyl-2-propanol (B.P. 94° C. at 12 mm. Hg) and 4-methyl-3-cyanopyridine. The dihydrochloride had a melting point of 240° C.

EXAMPLE 20

Using a procedure analogous to that described in Example 2, 3,4-dihydro-3,3-diethyl-1(3'-pyridyl)-isoquinoline, B.P. 131–133° C. at 0.01 mm. Hg, of the formula

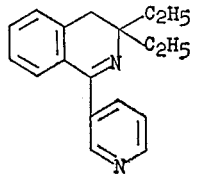

was prepared from 3-benzyl-3-pentanol (B.P. 121° C. at 12 mm. Hg) and 3-cyanopyridine. The dihydrochloride had a melting point of 188–190° C.

EXAMPLE 21

Using a procedure analogous to that described in Example 2, 3,4-dihydro-3-methyl-3-ethyl-1-(3'-pyridyl)-isoquinoline, B.P. 130–131° C. at 0.04 mm. Mg, of the formula

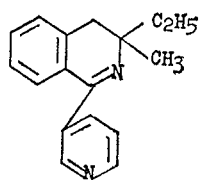

was prepared from 2-benzyl-2-butanol (B.P. 109–111° C. at 12 mm. Hg) and 3-cyanopyridine. The dihydrochloride had a melting point of 176–178° C.

EXAMPLE 22

Using a procedure analogous to that described in Example 8, 3,4-dihydro-1-(4'-pyridyl)-isoquinoline-3-spirocyclopentane, B.P. 150° C. at 0.04 mm. Hg, of the formula

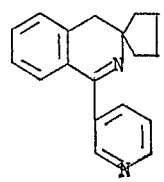

was prepared from 1-benzyl-1-cyclopentanol (B.P. 134° C. at 15 mm. Hg) and 4-cyanopyridine. The dihydrochloride had a melting point of 245° C.

EXAMPLE 23

Using a procedure analogous to that described in Example 8, 3,4-dihydro-1-(3'-pyridyl)-isoquinoline-3-spirocyclopentane, B.P. 151° C. at 0.05 mm. Hg, of the formula

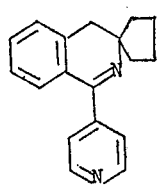

was prepared from 1-benzyl-1-cyclopentanol (B.P. 134° C. at 15 mm. Hg) and 3-cyanopyridine. The dihydrochloride had a melting point of 182–184° C.

EXAMPLE 24

Using a procedure analogous to that described in Example 2, 3,4-dihydro-3-methyl-3-(p-chlorobenzyl)-1-(4'-pyridyl)-isoquinoline, B.P. 204–205° C. at 0.01 mm. Hg, of the formula

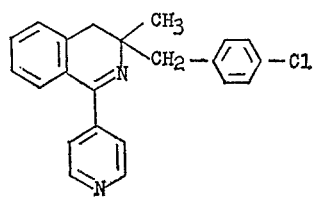

was prepared from 2-benzyl-3-(p-chlorophenyl)-2-propanol (B.P. 123° C. at 0.01 mm. Hg) and 4-cyanopyridine. The dihydrochloride had a melting point of 225–228° C.

EXAMPLE 25

Using a procedure analogous to that described in Example 2,3,4-dihydro-3-methyl-3-(p-methylbenzyl)-1-(4'- pyridyl)-isoquinoline, B.P. 208° C. at 0.4 mm. Hg, of the formula

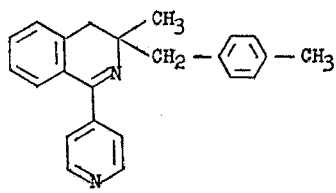

was prepared from 2-benzyl-3-(p-methyl-phenyl)-2-propanol (B.P. 120° C. at 0.06 mm. Hg) and 4-cyanopyridine.

EXAMPLE 26

20 cc. of methanesulfonic acid were added dropwise to a solution of 5.2 gm. of 4-cyanopyridine in 10 cc. of o-dichlorobenzene. Thereafter, 7.5 gm. of 2-benzyl-2-propanol were added all at once, the resulting mixture was heated for one hour at 65° C., and the reaction mixture was worked up as described in Example 1. 5 gm. of colorless crystalline 3,4-dihydro - 3,3 - dimethyl-1-(4'-pyridyl)-isoquinoline, M.P. 170–171° C., were obtained.

EXAMPLE 27

The preceding example was repeated, except that 20 cc. of borontrifluoride-ethyletherate were used as the condensing agent in place of methanesulfonic acid, and the reaction mixture was heated for three hours at 70–80° C. 4 gm. of 3,4-dihydro-3,3-dimethyl - 1 - (4'-pyridyl) - isoquinoline were obtained.

EXAMPLE 28

A solution 5.2 gm. of 4-cyanopyridine in 50 cc. of o-dichlorobenzene was admixed with 7.5 gm. of 2-benzyl-2-propanol and 100 gm. of polyphosphoric acid, the mixture was heated for five hours at 80–100° C. while stirring, and the reaction mixture was worked up as described in Example 1. 6.5 gm. of crystalline 3,4-dihydro-3,3-dimethyl-1-(4'-pyridyl)-isoquinoline, M.P. 172° C., were obtained.

When 100 gm. of polyphosphate ester [prepared according to Schramm et al., Angewandte Chemie 74, 55 (1962)] were used as the condensing agent instead of polyphosphoric acid, the yield was 2 gm.

EXAMPLE 29

A solution of 10.4 gm. of 4-cyanopyridine in 30 cc. of o-dichlorobenzene was admixed with 15 gm. of 2-benzyl-2-propanol and 50 gm. of 100% phosphoric acid (prepared from phosphorus pentoxide and the calculated amount of water), and the mixture was heated for fourteen hours at 105° C. on an oil bath while stirring. Thereafter, the reaction mixture was worked up as described in Example 1. 8.5 gm. of crystalline 3,4-dihydro-3,3-dimethyl-1-(4'-pyridyl)-isoquinoline, M.P. 171–172° C., were obtained.

EXAMPLE 30

10.4 gm. of 4-cyanopyridine were admixed with 68 gm. of anhydrous zinc chloride, 30 gm. of glacial acetic acid and a few drops of sulfuric acid, 15 gm. of 2-benzyl-2-propanol were added, and the mixture was heated for twelve hours at 105° C. on an oil bath while stirring. Thereafter, the reaction mixture was worked up as described in Example 1. 4 gm. of crystalline 3,4-dihydro-3,3-dimethyl-1-(4'-pyridyl)-isoquinoline, M.P. 170° C., were obtained.

EXAMPLE 31

40 cc. of concentrated sulfuric acid were added dropwise, while cooling, to a solution of 20.8 gm. of 4-cyanopyridine in 60 cc. of xylene. Thereafter, without cooling, 36 gm. of 2-benzyl-2-propanol-acetate were added all at once while stirring, and the mixture was heated for two hours at 85° C. Subsequently, the reaction mixture was worked up as described in Example 1. 20 gm. of colorless crystalline 3,4 - dihydro - 3,3-dimethyl-1-(4'-pyridyl)-isoquinoline, M.P. 171–172° C., were obtained.

EXAMPLE 32

Preparation of 3,4-dihydro-3,3-dimethyl-1-(4'-pyridyl)-isoquinoline by Method B

A solution of 25.4 gm. of N-[(1,1-dimethyl-2-phenyl)-ethyl]-pyridine-4-carboxamide in 100 cc. of xylene was admixed with 40 gm. of phosphorus pentoxide and 80 gm. of phosphorus oxychloride, the resulting mixture was stirred for eight hours at room temperature and then refluxed for twelve hours and poured into water. The organic phase was separated and discarded. The aqueous phase was extracted several times with ether, and the ether extract solutions were discarded. The acid aqueous solution was made alkaline with sodium hydroxide, whereby a precipitate formed which was separated and taken up in chloroform. The chloroform solution was evaporated to dryness, and the residue was recrystallized from acetone. 5 gm. of 3,4 - dihydro - 3,3-dimethyl-1-(4'-pyridyl)-isoquinoline, M.P. 172° C., were obtained.

EXAMPLE 33

A mixture of 6.35 gm. of N-[(1,1-dimethyl-2-phenyl)-ethyl)]-pyridine-4-carboxamide, 20 gm. of phosphorus oxychloride and 20 gm. of zinc chloride in 20 cc. of o-dichlorobenzene was refluxed for seven hours, and the reaction mixture was then stirred into water. The organic phase was separated and discarded, and the aqueous phase was extracted with ether. The ether extract solution was also discarded. The aqueous phase was made alkaline with concentrated sodium hydroxide, whereby a precipitate was formed which was taken up in chloroform. The chloroform solution was evaporated and the residue was recrystallized from acetone. 2.5 gm. of 3-4,-dihydro-3,3-dimethyl-1-(4'-pyridyl)-isoquinoline, M.P. 172° C., were obtained.

EXAMPLE 34

31 gm. of phosphorus pentoxide were added to a solution of 6.4 gm. of N-[(1,1-dimethyl-2-phenyl)-ethyl]-pyridine-4-carboxamide in 200 cc. of tetrahydronaphthalene, the mixture was refluxed for fifteen minutes, 31 additional grams of phosphorus pentoxide were added, and the mixture was again refluxed for fifteen minutes. After allowing the reaction mixture to cool, the solvent was decanted, water was added to the residue, the aqueous mixture was made alkaline with sodium hydroxide, and the alkaline mixture was extracted with chloroform. For purification purposes the chloroform extract solution was extracted with dilute hydrochloric acid, the acid aqueous extract solution was made alkaline with sodium hydroxide, and the precipitate formed thereby was again taken up in chloroform. The chloroform solution was dried, the chloroform was evaporated, and the residue was recrystallized from acetone. 2 gm. of 3,4-dihydro-3,3-dimethyl-1-(4'-pyridyl)-isoquinoline, M.P. 171–172° C., were obtained.

EXAMPLE 35

Preparation of 3,4-dihydro-1-(4'-pyridyl)-isoquinoline-3-spiro-cyclohexane by Method B Using a procedure analogous to that described in Example 34, 3,4-dihydro-1-(4'-pyridyl)-isoquinoline-3-spiro-cyclohexane was obtained by heating 7.4 gm. of N-(1-benzyl-cyclohexyl)-isonicotinic acid amide (M.P. 148–150° C.) with phosporus pentoxide in tetrahydronaphthalene. The yield was 2 gm. Its dihydrochloride had a melting point of 248–250° C.

EXAMPLE 36

A solution of 25 gm. of N-[(1,1-dimethyl-2-phenyl)-ethyl]-pyridine-4-carboxamide (M.P. 132–133° C.) in 100 cc. of o-dichlorobenzene was admixed with 150 gm. of polyphosphoric acid, and the resulting mixture was heated at 180–190° C. for three hours while stirring. Thereafter, the reaction mixture was poured into warm water, the aqueous solution was allowed to cool, and then ether was added. The aqueous phase was separated, made alkaline with aqueous 40% sodium hydroxide, and extracted with chloroform. The chloroform extract solution was evaporated, and the residue was recrystallized from ethyl acetate. 4 gm. of 3,4-dihydro-3,3-dimethyl-1-(4'-pyridyl)-isoquinoline, M.P. 171° C., were obtained.

EXAMPLE 37

A solution of 12.7 gm. of N-[(1,1-dimethyl-2-phenyl)-ethyl]-pyridine-4-carboxamide in 125 cc. of o-dichlorobenzene was admixed with 13 gm. of phosphorus pentachloride, the resulting mixture was stirred for one hour at room temperature, 13 gm. of powdered anhydorus aluminum chloride were added, and the mixture was heated for ninety minutes at an external temperature of 100–120° C. while stirring. Thereafter, the reaction mixture was allowed to cool, ice and water were added, and the aqueous phase was separated and extracted with ether. The solvent phase and the ether extract solution were discarded. The aqueous phase was then made alkaline with aqueous 40% sodium hydroxide, the precipitate formed thereby was taken up in chloroform, the chloroform solution was evaporated, and the residue was recrystallized from acetone. 6 gm. of 3,4-dihydro-3,3-dimethyl-1-(4'-pyridyl)-isoquinoline, M.P. 172° C., were obtained.

EXAMPLE 38

Preparation of 3,4-dihydro-3,3,7-trimethyl-1-(4'-pyridyl)-isoquinoline by Method B Using a procedure analogous to that described in Example 37, 3,4-dihydro-3,3,7-trimethyl-1-(4'-pyridyl)-isoquinoline was prepared from N-[(1,1-dimethyl-2-p-methyl - phenyl) - ethyl] - pyridine - 4 - carboxamide (M.P. 122° C.). Its dihydrochloride had a melting point of 267° C.

EXAMPLE 39

Preparation of 7-chloro-3,4-dihydro-3,3-dimethyl-1-(4'-pyridyl)-isoquinoline by Method B Using a procedure analogous to that described in Example 37, 7 - chloro - 3,4 - dihydro - 3,3 - dimethyl - 1 - (4'-pyridyl)-isoquinoline, B.P. 168–170° C. at 0.05 mm. Hg, was prepared from N - [(1,1 - dimethyl - 2 - p-chlorophenyl) - ethyl] - pyridine - 4 - carboxamide (M.P. 123° C.).

EXAMPLE 40

Preparation of 3,4-dihydro-3,3,4-trimethyl-1-(4'-pyridyl)-isoquinoline by Method B Using a procedure analogous to that described in Example 37, 3,4 - dihydro - 3,3,4 - trimethyl - 1 - (4'-pyridyl)-isoquinoline, B.P. 134–136° C. at 0.01 mm. Hg, M.P. 63–64° C, recrystallized from petroleum ether, was prepared from N - [(1,1 - dimethyl - 2 - methyl - 2-phenyl)-ethyl]-pyridine-4-carboxamide (BP. 168–169° C. at 0.3 mm. Hg).

EXAMPLE 41

Preparation of 3,4-dihydro-3-benzyl-3-methyl-1-(4'-pyridyl)-isoquinoline by Method B Using a procedure analogous to that described in Example 37, 3,4 - dihydro - 3 - benzyl - 3 - methyl - 1 - (4'-pyridyl)-isoquinoline was prepared from N-[(2-phenyl-1-benzyl - 1 - methyl) - ethyl] - pyridine - 4 - carboxamide (M.P. 148° C.). Its dihydrochloride had a melting point of 236° C.

EXAMPLE 42

Preparation of 3,4-dihydro-3,3-dimethyl-1-(4'-methyl-3'-pyridyl)-isoquinoline by Method B Using a procedure analogous to that described in Example 37, 3,4 - dihydro - 3,3 - dimethyl - 1 - (4' - methyl-3'-pyridyl)-isoquinoline was prepared from N-[(2-phenyl - 1,1 - dimethyl) - ethyl] - 4 - methyl - pyridine - 3-carboxamide (M.P. 74–75° C.). Its dihydrochloride had a melting point of 240° C.

EXAMPLE 43

Preparation of 3,4-dihydro-3,3-dimethyl-1-(4'-pyridyl)-isoquinoline by Method C 2.6 gm. of 4-cyanopyridine were admixed with 6.5 gm. of tin tetrachloride, the mixture was heated to between 50 and 60° C., while stirring, and then 6.3 gm. of 2-methyl-2-chloro-1-phenylpropane were added dropwise, whereby the temperature rose to 70–80° C. The reaction mixture was then heated for two hours on an oil bath at 130° C., allowed to cool and then made alkaline with aqueous 20% sodium hydroxide. The alkaline solution was extracted with chloroform, the chloroform extract solution was evaporated, the residue was stirred with petroleum ether and was finally recrystallized from acetone. 1 gm. of 3,4-dihydro-3,3-dimethyl-1-(4'-pyridyl)-isoquinoline, M.P. 171° C., were obtained.

The same compound was obtained with the same yield when 2 - methyl - 2 - bromo - 1 - phenylpropane was used in place of 2 - methyl - 2 - chloro - 1 - phenylpropane.

The same results were obtained when 6.0 gm. of antimony trichloride or 4 gm. of bromo-trifluoride ethyl-etherate or 7.7 gm. of antimony pentachloride or 4 gm. of ferric chloride or 4 gm. of titanium tetrachloride were used in place of 6.5 gm. of tin tetrachloride.

EXAMPLE 44

11.2 gm. of pulverized anhydrous aluminum chloride were added all at once to a solution of 10.4 gm. of 4-cyanopyridine and 16.8 gm. of 2 - methyl - 2 - chloro - 1 - phenylpropane in 20 cc. of o-dichlorobenzene, while stirring, whereby the temperature of the mixture rose. Thereafter, the reaction mixture was heated for two hours on an oil bath at 110° C. Subsequently, the reaction mixture was worked up as described in Example 43. 3 gm. of 3,4-dihydro - 3,3 - dimethyl - 1 - (4' - pyridyl) - isoquinoline, M.P. 171° C., were obtained.

EXAMPLE 45

Preparation of 3,4-dihydro-3-ethyl-3-methyl-1-(3'-pyridyl)isoquinoline by Method C A solution of 10.4 gm. of 3-cyanopyridine in 20 cc. of o-dichlorobenzene was admixed with 26 gm. of tin tetrachloride while cooling; 24 gm. of 2-methyl-2-chloro-1-phenylbutane were then added while stirring, and the reaction mixture was heated for eight hours at 130–140° C. Thereafter the solvent was decanted from the solid matter, and the latter was stirred with aqueous 40% sodium hydroxide, whereby an oil separated out which was taken up in ether. The ether solution was evaporated and the oily residue was distilled. 4.5 gm. of 3,4-dihydro-3-ethyl-3-methyl - 1 - (3' - pyridyl) - isoquinoline, B.P. 130–131° C. at 0.01 mm. Hg, were obtained.

EXAMPLE 46

Preparation of 3,4 - dihydro - 3,3 - dimethyl - 1 - (4' - pyridyl)isoquinoline by Method D 15 gm. of 4-cyanopyridine were dissolved in 30 cc. of anhydrous o-dichlorobenzene, and the solution was admixed dropwise with 39.2 gm. of tin tetrachloride. Thereafter, 19.8 gm. of β,β-dimethyl-styrolene were added, and the mixture was heated for one hour at 110° C. Subsequently, the reaction mixture was allowed to cool, was poured over 300 gm. of ice, and the aqueous mixture was extracted twice with 100 cc. portions of ether. The ether extract solutions were discarded. The aqueous phase was made alkaline with sodium hydroxide and was extracted with chloroform. The chloroform solution was evaporated, and the residue was recrystallized from acetone. 4 gm. of 3,4 - dihydro - 3,3 - dimethyl - 1 - (4' - pyridyl) - isoquinoline, M.P. 172–173° C., were obtained.

15

When 20 gm. of aluminum chloride were used in place of 39.2 gm. of tin tetrachloride, the same compound was obtained, but the yield was slightly smaller.

EXAMPLE 47

Using a procedure analogous to that described in Example 46, the 4-cyanopyridine-tin tetrachloride complex was prepared from 15 gm. of 4-cyanopyridine and 39.2 gm. of tin tetrachloride in 30 cc. of absolute o-dichlorobenzene. Thereafter, dry hydrogen chloride was introduced into the solution for fifteen minutes. Subsequently, 19.8 gm. of β,β-dimethyl-styrolene were added all at once, whereby the temperature rose to 40° C., and the mixture was heated for one hour more at 110° C. while stirring and continuing to introduce a vigorous stream of dry hydrogen chloride gas. The reaction mixture was then worked up as described in the preceding example, yielding 20 gm. of 3,4 - dihydro - 3,3 - dimethyl - 1 - (4' - pyridyl)-isoquinoline, M.P. 173° C.

When 20 gm. of aluminum chloride or 34.2 gm. of antimony trichloride were used in place of 39.2 gm. of tin tetrachloride, 16 gm. or 1 gm., respectively, of the same compound were obtained.

EXAMPLE 48

29.9 gm. of antimony pentachloride were added dropwise to a solution of 10 gm. of 4-cyanopyridine in 50 cc. of 1,1,2,2-tetrachloroethane, and then dry hydrogen chloride was introduced into the mixture for fifteen minutes. Subsequently, 12.3 gm. of β,β-dimethyl-styrolene were added, whereby the temperature of the mixture rose to 40° C.; the mixture was heated at 150° C. for ninety minutes while stirring and continuing to introduce a vigorous stream of hydrogen chloride. Thereafter, the reaction mixture was allowed to cool, was poured over 200 gm. of ice, and the aqueous mixture was extracted twice with 100 cc. portions of ether. The ether extract solutions were discarded, and the aqueous phase was made alkaline with sodium hydroxide and was then extracted with chloroform. The chloroform extract solution was evaporated, and the residue was refluxed for four hours with 50 cc. of 3 N hydrochloric acid. The acid solution was made alkaline and was then worked up as described in Example 46. 1.5 gm. of 3,4-dihydro-3,3-dimethyl-1(4'-pyridyl)-isoquinoline, M.P. 171° C., were obtained.

EXAMPLE 49

39.2 gm. of tin tetrachloride were added dropwise to a solution of 10 gm. of 4-cyanopyridine in 30 cc. of o-dichlorobenzene, and then 22.5 gm. of 2-benzyl-2-propanol were added all at once to the mixture, whereby the temperature of the mixture rose to about 40° C. The reaction mixture was then heated for one hour at 110° C. and was thereafter worked up as described in Example 46. 2.3 gm. of crystalline 3,4-dihydro-3,3-dimethyl-1-(4'-pyridyl)-isoquinoline, M.P. 170° C., were obtained.

When the reaction was carried out while continuously introducing hydrogen chloride into the reaction mixture, 12 gm. of the same compound having a melting point of 173° C. were isolated.

EXAMPLE 50

Preparation of 3,4-dihydro-3,3-dimethyl-1-(3'-pyridyl)-isoquinoline by Method D

A solution of 10.4 gm. of 3-cyanopyridine in 30 cc. of o-dichlorobenzene was gradually admixed with 16.2 gm. of ferric chloride. Thereafter, dry hydrogen chloride was introduced into the mixture for fifteen minutes, and then 12.3 gm. of β,β-dimethyl-styrolene were added and the reaction mixture was heated for one hour at 120° C. while continuing to introduce gaseous hydrogen chloride. Thereafter, the reaction mixture was worked up as described in Example 46, yielding 1.5 gm. of crystalline 3,4-dihydro-3,3-dimethyl-1-(3'-pyridyl)-isoquinoline, M.P. 95–97° C. (recrystallized from gasoline).

16

EXAMPLE 51

13.6 gm. of anhydrous zinc chloride were added to a solution of 10.4 gm. of 3-cyanopyridine in 30 cc. of o-dichlorobenzene, and then dry hydrogen chloride was introduced into the mixture for fifteen minutes. Thereafter, 12.3 gm. of β,β-dimethyl-styrolene were added all at once, and the reaction mixture was heated for twenty hours at 150° C. while continuing to introduce hydrogen chloride. The reaction mixture was thereafter worked up as described in Example 46, yielding 11 gm. of 3,4-dihydro-3,3-dimethyl-1-(3'-pyridyl)-isoquinoline, M.P. 96–97° C.

EXAMPLE 52

Preparation of 3,4-dihydro-3-benzyl-3-methyl-1-(4'-pyridyl)-isoquinoline by Method D 4.3 gm. of 4-cyanopyridine were dissolved in 30 cc. of o-dichlorobenzene, and the solution was admixed dropwise with 18.3 gm. of tin tetrachloride. Thereafter, dry hydrogen chloride was introduced for fifteen minutes into the mixture, and then 14.6 gm. of 1,3-diphenyl-2-methylpropene were added all at once, and the mixture was heated for five hours at 150° C. while continuing to introduce hydrogen chloride. Subsequently, the reaction mixture was poured over 200 gm. of ice, the aqueous mixture was extracted twice with 100 cc. portions of ether, and the ether extract solutions were discarded. The aqueous phase was made alkaline with sodium hydroxide, and the alkaline solution was extracted with chloroform. After evaporating the chloroform extract solution, 4.5 gm. of a viscous oil remained behind which was dissolved in acetone and the resulting solution was treated with hydrogen chloride. 4.5 gm. of 3,4-dihydro-3-benzyl-3-methyl-1-(4'-pyridyl)-isoquinoline-dihydro-chloride, M.P. 236–238° C. were obtained.

EXAMPLE 53

Preparation 3,4-dihydro-3,3-dimethyl-1-(3'-pyridyl)-isoquinoline by Method C 10.4 gm. of 3-cyanopyridine were dissolved in 50 cc. of o-dichlorobenzene, and the solution was admixed dropwise with 39.2 gm. of tin tetrachloride. Thereafter, dry hydrogen chloride was introduced into the mixture for fifteen minutes, and then 22.5 gm. of 2-methyl-1-phenyl-1-propanol were added all at once, whereby the temperature of the mixture rose from 20 to 45° C. Subsequently, the reaction mixture was heated for one hour at 130° C. and was then worked up as described in Example 46. 3.5 gm. of crystalline 3,4-dihydro-3,3-dimethyl-1-(3'-pyridyl)-isoquinoline, M.P. 95–97° C., were obtained.

EXAMPLE 54

52 gm. of tin tetrachloride were added dropwise to a solution of 10.4 gm. of 4-cyanopyridine in 50 cc. of chlorobenzene, and then dry hydrogen chloride was introduced into the mixture for fifteen minutes. Thereafter, 19.2 gm. of 2-benzyl-2-propanol acetate were added to the mixture all at once, whereby the temperature rose by 50° C. While continuing to introduce hydrogen chloride, the reaction mixture was refluxed for five hours, and then it was worked up as described in Example 46. 4.5 gm. of crystalline 3,4-dihydro-3,3-dimethyl-1-(4'pyridyl)-isoquinoline, M.P. 171–172° C., were obtained.

When the introduction of hydrogen chloride during the reaction was omitted, the product was obtained in only very small amounts.

EXAMPLE 55

10.4 gm. of 4-cyanopyridine and 19.2 gm. of 2-benzyl-2-propanol acetate were dissolved in 50 cc. of chlorobenzene, dry hydrogen chloride was introduced into the mixture for five minutes, and then 40 gm. of aluminum chloride were added, whereby the temperature of the mixture rose by 40° C. While continuing to introduce hydrogen chloride, the reaction mixture was refluxed for five hours and was then worked up as described in Example 46. 5 gm. of 3,4- dihydro-3,3-dimethyl-1-(4' - pyridyl) - isoquinoline, M.P. 171–172° C., were obtained.

The compounds of the present invention, that is, the dihydroisoquinoline derivatives embraced by Formula I above and their non-toxic, pharmacologically acceptable acid addition salts, have useful pharmacodynamic properties. More particularly, they exhibit antiphlogistic and antipyretic, effects in warm-blooded animals.

For pharmaceutical purposes the compounds according to the present invention are administered to humans and warm-blooded animals perorally or parenterally as active ingredients in customary dosage unit compositions consisting essentially of an inert pharmaceutical carrier and one dosage unit of the active ingredient, such as tablets, coated pills, solutions, emulsions, suspensions, suppositories and the like. One dosage unit of the compounds according to the invention is from 25 to 300 mgm.

The following examples illustrate a few dosage unit compositions comprising a compound according to the invention as an active ingredient. The parts are parts by weight, unless otherwise specified.

EXAMPLE 56

Tablets

The tablet composition is compounded from the following ingredients:

| | Parts |
|---|---|
| 3,4-dihydro-3,3-dimethyl-1-(4'-pyridyl) - isoquinoline dihydrochloride | 150.0 |
| Colloidal silicic acid | 100.0 |
| Lactose | 240.0 |
| Potato starch | 100.0 |
| Tartaric acid | 5.0 |
| Magnesium stearate | 5.0 |
| Total | 600.0 |

Compounding procedure.—The dihydroisoquinoline compound, the colloidal silicic acid, the lactose and one-half of the indicated amount of potato starch are admixed with each other, and the mixture is granulated by moistening it with an aqueous 3.5% solution of the tartaric acid, forcing the moist mixture through a 1.5 mm.-mesh screen, drying the moist granulate at 45° C. and again passing the dry granulate through the screen. The dry granulate is admixed with the remaining amount of potato starch and with the magnesium stearate, and the composition is pressed into 600 mgm.-tablets. Each tablet contains 150 mgm. of the active ingredient.

EXAMPLE 57

Coated pills

The pill core composition is compounded from the following ingredients:

| | Parts |
|---|---|
| 3,4-dihydro-3,3-dimethyl-1-(4'-pyridyl) - isoquinoline dihydrochloride | 25.0 |
| Colloidal silicic acid | 15.0 |
| Lactose | 63.0 |
| Potato starch | 15.0 |
| Tartaric acid | 1.0 |
| Magnesium stearate | 1.0 |
| Total | 120.0 |

Compounding procedure.—The procedure is the same as for the tablets in the preceding example, except that the composition is pressed into 120 mgm.-pill cores, which are then coated with a thin shell consisting essentially of sugar and talcum. The coated pills are finally polished with beeswax. Each coated pill weighs approximately 200 mgm. and contains 25 mgm. of the active ingredient.

EXAMPLE 58

Hypodermis solution

The solution is compounded from the following ingredients:

| | | |
|---|---|---|
| 3,4-dihydro-3,3-dimethyl-1-(4'-pyridyl) - isoquinoline dihydrochloride | parts | 50.0 |
| Citric acid·H$_2$O | do | 14.0 |
| Secondary sodium phosphate·2H$_2$O | do | 6.0 |
| Distilled water, q.s. ad | parts by volume | 2000.0 |

Compounding procedure.—The citric acid, the sodium phosphate and the dihydroisoquinoline compound are dissolved in that sequence in a sufficient amount of distilled water, the solution is diluted to the indicated volume with distilled water, filtered until free from suspended particles, and filled into brown 2 cc.-ampules. The filled ampules are then sterilized for thirty minutes at 100° C. and sealed. Each ampules contains 50 mgm. of the active ingredient.

EXAMPLE 59

Suppositories

The suppository composition is compounded from the following ingredients:

| | Parts |
|---|---|
| 3,4-dihydro-3,3-dimethyl-1-(4'-pyridyl) - isoquinoline | 100.0 |
| Cocoa butter | 1630.0 |
| Total | 1730.0 |

Compounding procedure.—The cocoa butter is melted and then cooled to about 40° C., and the dihydroisoquinoline compound is stirred into it with the aid of an immersion homogenizer. The composition is then poured into cooled suppository molds, each holding 1.73 gm. of the composition. Each suppository contains 100 mgm. of the active ingredient.

Although only 3,4-dihydro-3,3-dimethyl-1-(4'-pyridyl)-isoquinoline and its dihydrochloride are illustrated as active ingredients in Examples 56 to 59, it should be understood that any of the other compounds embraced by Formula I or their non-toxic, pharmacologically acceptable acid addition salts may be substituted therefor in these examples. Moreover, the amount of active ingredient in these examples may be varied within the dosage unit limits set forth above. Likewise, the nature and amounts of the inert pharmaceutical carrier components may be varied to meet particular requirements.

We claim:
1. A compound of the formula

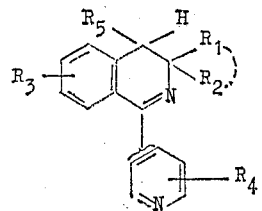

wherein $R_1$ is alkyl of 1 to 5 carbon atoms or

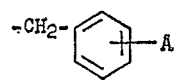

where A is hydrogen, methyl or halogen; $R_2$ is alkyl of 1 to 5 carbon atoms; $R_1$ and $R_2$, together with each other and the carbon atom to which they are attached, form a cycloalkane ring of 5 to 6 carbon atoms; $R_3$ is hydrogen, lower alkyl or halogen; and $R_4$ and $R_5$ are hydrogen or lower alkyl, or a non-toxic, pharmacologically acceptable acid addition salt thereof.

2. A compound of the formula of claim 1, wherein $R_1$ is alkyl of 1 to 5 carbon atoms, benzyl, methylbenzyl or chlorobenzyl; $R_2$ is alkyl of 1 to 3 carbon atoms; $R_1$ and $R_2$, together with each other and the carbon atom to which they are attached, form a cyclopentyl or cyclohexyl ring; $R_3$ is hydrogen, methyl or chlorine; and $R_4$ and $R_5$ are hydrogen or methyl; or a non-toxic, pharmacologically acceptable acid addition salt thereof.

3. 3,4-dihydro-3,3-dimethyl-1-(4' - pyridyl)-isoquinoline.

4. 3,4-dihydro-3-ethyl - 3 - methyl-1-(4'-pyridyl)-isoqiunoline.

5. 3,4-dihydro-3,3-diethyl - 7 - chloro-1-(4'-pyridyl)-isoquinoline.

6. 3,4-dihydro-3,3,7 - trimethyl - 1-(4'-pyridyl)-isoquinoline.

7. 3,4-dihydro-3,3-dimethyl-1-(3' - pyridyl)-isoquinoline.

8. The process of preparing a compound of the formula

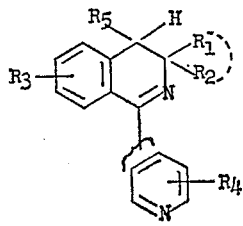

wherein $R_1$ is alkyl of 1 to 5 carbon atoms or

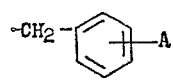

where A is hydrogen, methyl or halogen; $R_2$ is alkyl of 1 to 5 carbon atoms; $R_1$ and $R_2$, together with each other and the carbon atom to which they are attached, form a cycloalkane ring of 5 to 6 carbon atoms; $R_3$ is hydrogen, halogen or lower alkyl; and $R_4$ and $R_5$ are hydrogen or lower alkyl, which comprises reacting a cyanopyridine compound of the formula

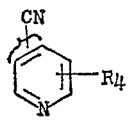

wherein $R_4$ has the meanings defined above, with a compound of the formula

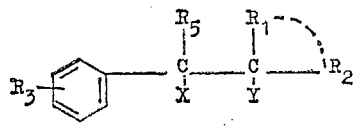

wherein $R_1$, $R_2$, $R_3$ and $R_5$ have the meanings defined above, and X and Y, which are different from each other, are hydrogen, hydroxyl, hydroxyl esterified with a carboxylic or sulfonic acid, or halogen provided one of them is hydrogen, or together form a double bond, in the presence of an acid cyclo-condensing agent selected from the group consisting of sulfuric acid, phosphoric acid, bornotrifluoride, methanesulfonic acid, polyphosphoric acid, aromatic sulfonic acids, polyphosphoric acid esters and zinc chloride, at a temperature between 70 and 125° C., and recovering the reaction product.

9. The process of preparing a compound of the formula

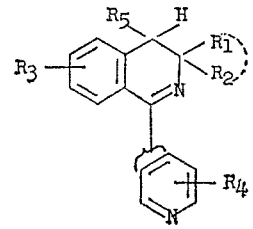

wherein $R_1$ is alkyl of 1 to 5 carbon atoms or

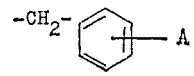

where A is hydrogen, methyl or halogen; $R_2$ is alkyl of 1 to 5 carbon atoms; $R_1$ and $R_2$, together with each other and the carbon atom to which they are attached, form a cycloalkane ring of 5 to 6 carbon atoms; $R_3$ is hydrogen, lower alkyl or halogen; and $R_4$ and $R_5$ are hydrogen or lower alkyl, which comprises reacting a metal halide complex compound of a cyanopyridine of the formula

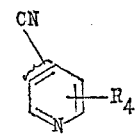

wherein $R_4$ has the meanings defined above, with a compound of the formula

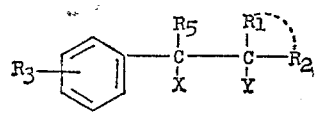

wherin $R_1$, $R_2$, $R_3$ and $R_5$ have the meanings defined above, one of substituents X and Y is hydrogen and the other hydroxyl, halogen, or hydroxyl esterified with carboxylic or sulfonic acid, at a temperature between 50 and 170° C., while introducing a gaseous hydrogen halide into the reaction mixture, and recovering the reaction product.

10. The process of preparing a compound of the formula

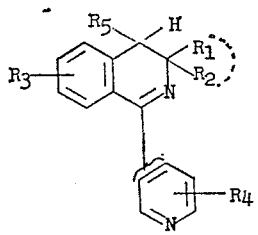

wherein $R_1$ is alkyl of 1 to 5 carbon atoms or

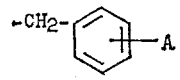

where A is hydrogen, methyl or halogen; $R_2$ is alkyl of 1 to 5 carbon atoms; $R_1$ and $R_2$, together with each other and the carbon atom to which they are attached, form a cycloalkane ring of 5 to 6 carbon atoms; $R_3$ is hydrogen, lower alkyl or halogen; and $R_4$ and $R_5$ are hydrogen or lower alkyl, which comprises reacting a cyanopyridine of the formula

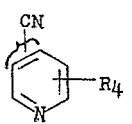

wherein $R_4$ has the meanings defined above, with a styrolene of the formula

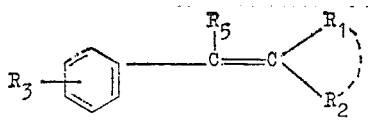

wherein $R_1$, $R_2$, $R_3$ and $R_5$ have the meanings defined above, in the presence of a Lewis acid and while introducting a gaseous hydrogen halide into the reaction mixture, and recovering the reaction product.

References Cited
UNITED STATES PATENTS

| | | | |
|---|---|---|---|
| 3,133,926 | 5/1964 | Kuehne | 260—288 X |
| 3,205,233 | 9/1965 | Clarkson | 260—288 |
| 3,301,857 | 1/1967 | Berger et al. | 260—288 |

OTHER REFERENCES

Chem. Abst.: vol. 62, A–I Subject Index, p. 1481S (January-June 1965).

Chem. Abstr.: vol. 62, col. 16783(Q) Abstracting Sheikova et al. (1965).

Elderfield: Heterocyclic Compounds, vol. 10, Wiley, 1952, pp. 361–2.

Ritter et al., Jour Am. Chem. Soc., vol. 74, pp. 763–5 (1962).

ALEX MAZEL, Primary Examiner

D. G. DAUS, Assistant Examiner

U.S. Cl. X.R.

260—256, 270, 286, 294.9, 295.5, 465, 469, 613, 618, 651; 424—258

UNITED STATES PATENT OFFICE
CERTIFICATE OF CORRECTION

Patent No. 3,457,265                                            July 22, 196

Ernst Seeger et al.

It is certified that error appears in the above identified patent and that said Letters Patent are hereby corrected as shown below:

Column 1, line 46, "alykl" should read -- alkyl --; line 50, "lowed" should read -- lower --. Column 2, line 8, "hydrogen," should read -- hydrogen --; line 11, after "boron-trifluoride" insert a comma; line 19, "tetrachlorethylene" should read -- tetrachloroethylene --. Column 4, line 50, "trataric" should read -- tartaric --. Column 5, line 6, and column 10, line 25, correct the formulas as follows:

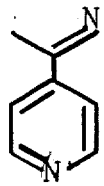

Column 5, line 36, "war" should read -- was --; line 64, "1720° C." should read -- 172° C. --. Column 6, line 35, correct the formula as follows:

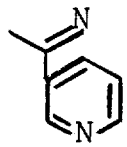

same column 6, line 41, "etheral" should read -- ethereal --. Column 10, line 1, "Mg" should read -- Hg --. line 44, correct the formula as follows:

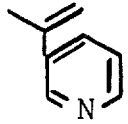

Column 13, line 17, "anhydorus" should read -- anhydrous --. Column 18, line 2, "Hypodermis" should read -- Hypodermic --; line 19, "ampules" should read -- ampule --.

Signed and sealed this 28th day of April 1970.

(SEAL)
Attest:

EDWARD M. FLETCHER, JR.                          WILLIAM E. SCHUYLER, J